Jan. 6, 1970     T. A. SMITH     3,488,190

METHOD FOR PREPARING COLOR SEPARATION PRINTING NEGATIVES

Filed June 22, 1967

INVENTOR
THEODORE A. SMITH
BY John T. O'Halloran
ATTORNEY

United States Patent Office
3,488,190
Patented Jan. 6, 1970

3,488,190
METHOD FOR PREPARING COLOR SEPARATION PRINTING NEGATIVES
Theodore A. Smith, Gladwyne, N.J., assignor to RCA Corporation, a corporation of Delaware
Filed June 22, 1967, Ser. No. 648,029
Int. Cl. G03c 7/16
U.S. Cl. 96—17           11 Claims

ABSTRACT OF THE DISCLOSURE

A color scene is photographed on black and white film through a trichromatic spatial filter to produce an image that effectively contains the color information of the original scene in the form of black and white tones. A positive transparency of such a black and white film is developed. The transparency is then illuminated with collimated light from a point source and an objective lens is positioned behind the positive transparency. A series of masks, each having differently spaced apertures, are then sequentially positioned at the focal plane of the objective lens to pass the spatially separated light. Each mask includes a pair of apertures positioned to correspond to the color information from one of the additive primary colors effectively contained in the black and white transparency. Consequently, a red aperture mask is positioned at the focal plane of the objective lens and the light penetrating through the apertures is focused onto a photosensitive film to provide a red separation negative in gray scale tones. Similarly, blue and green aperture masks are in turn positioned at the focal plane to provide blue and green separation negatives. The three separation negatives are further processed to provide printing plates for reproducing the original scene by ink. A black negative may also be produced and utilized in the preparation of a printing plate.

BACKGROUND OF THE INVENTION

In present printing techniques, a scene is photographed on color film and processed to provide a positive transparency. The positive transparency is then photographed and screened sequentially through color separation filters to provide the color separation negatives necessary for producing the color printing plates. The printing plates produced are inked and impressed sequentially on paper proofs. It may be necessary to run off several proofs with a photoengraver altering the sizes of the screened dot structures on the printing plates after each proof before the correct color balance is produced. This is a time consuming and expensive process.

SUMMARY OF THE INVENTION

Color separation negatives of an original color scene are obtained through the steps of photographing the original scene through a trichromatic spatial filter onto black and white photographic film and developing the film into a positive transparency. The black and white transparency effectively contains a coded form of the colors of the original scene. The positive transparency is illuminated with collimated light from a point source and the light transmitted through the transparency is focused at the focal plane of a focusing lens so that the different colors effectively contained in the transparency are separated from each other spatially at the focal plane. A plurality of monochromatic masks with each mask having at least one aperture positioned to pass one of the different colors effectively contained in the transparency are positioned one at a time in the focal plane. The light transmitted through each of the masks is focused onto separate photosensitive film to provide when developed the color separation negatives of the original scene.

An aspect of the invention is that the color separation negatives can be color corrected without printing proofs by positioning at the focal plane a polychromatic mask having a plurality of apertures, with each aperture corresponding to a color spatially separated at the focal plane. Primary additive color filters are positioned at the apertures corresponding to these primry colors and the light transmitted through the filters is focused onto a translucent surface where the spatially separated colors are superimposed on each other to simulate the original scene. When color correction is desired, neutral density filters are juxtaposed adjacent the apertures in the polychromatic mask to attenuate the transmitted light and change the color balance in the simulated scene. When the desired color balance is obtained, the polycromatic mask is removed and the monochromatic masks are positioned one at a time at the focal plane with the correct neutral density filters juxtaposed adjacent the correct masks to produce corrected color separation negatives.

DETAILED DESCRIPTION

Figure 1:
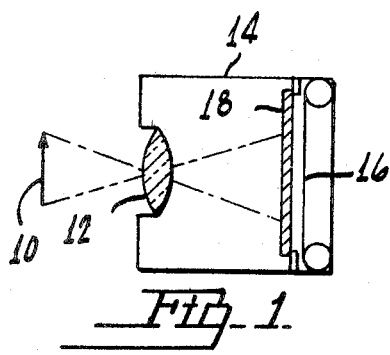
FIGURE 1 is a schematic representation of a camera for photographing an original scene which is to be reproduced by printing techniques.

Referring now to FIGURE 1, there is illustrated the manner in which an original color scene 10 is photographed so that color separation negatives may be prepared from the photographic film. The original color scene, represented schematically by an arrow 10 is focused by a lens 12 in a camera 14 onto a photosensitive medium such as ordinary black and white photographic film 16. Mounted immediately adjacent and preceeding the photographic film 16 is a trichromatic spatial filter 18. The trichromatic spatial filter 18 effectively permits the color scene 10 to be photographed by black and white film 16, rather than color film, but still retain the color information contained in the original scene although in a coded form.

Figure 2:
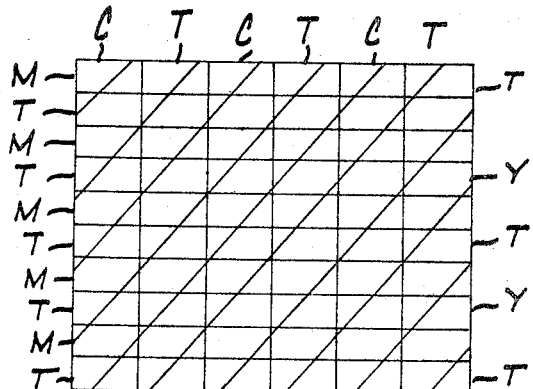
FIGURE 2 is a schematic representation of a trichromatic spatial filter utilized in the camera of FIGURE 1.

A schematic representation of the trichromatic spatial filter 18 is shown in FIGURE 2. The trichromatic spatial filter 18 is of a known type and may, for example, comprise a plurality of gratings superimposed on one another and disposed at different angles to each other. The trichromatic spatial filter 18 includes three different gratings with each grating including a plurality of strips of one of the subtractive primary colors alternating with a plurality of transparent strips. Thus, the vertical strips in the grating 18 are composed of a plurality of cyan strips C separated by the transparent strips T. At an angle of substantially 30° to the vertical, a plurality of oblique yellow strips Y are provided and alternate with a plurality of oblique transparent strips T. A plurality of horizontal magenta strips M are separated by a plurality of transparent strips T. The yellow, cyan, magenta and transparent strips may for example be made of glass or plastic that is appropriately colored. The differently colored strips may be made of different widths so that the number of strips per inch varies between the yellow, the cyan and the magenta gratings. A typical number of strips per inch would be 300 for one grating, with the second grating having 10% less and the third grating 10% more. Each grating effectively causes a different color to be extracted from the original color scene 10. Thus the photographic image 16 of the original scene 10 effectively contains all of the color information in the scene even though the image 16 is on black and white film. However, this color information is in coded form. The photographic image 16 is developed and a positive transparency made.

Figure 3:
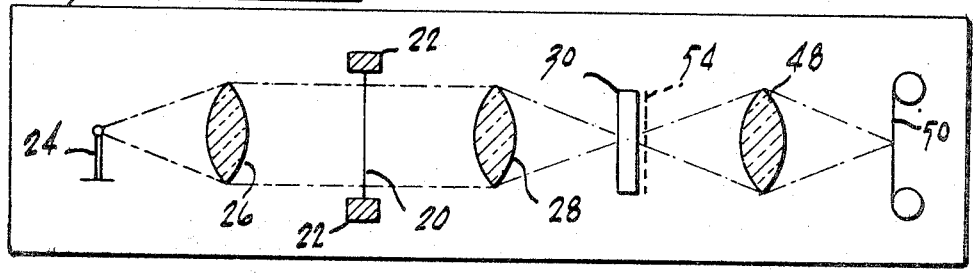
FIGURE 3 is a schematic representation of the preparation of color separation negatives in accordance with the invention.

In FIGURE 3, a schematic representation of the method of utilizing a positive transparency 20, developed from the photographic image 16, to extract the coded color information therein by spatially separating the colors for preparing color separation negatives of the original scene 10 is shown. The theory underlying the spatial separation of colors (i.e. frequencies) is described in the article entitled "Optical Data Processing and Filtering Systems" by L. J. Cutrona et al., appearing in the June 1960 issue of the IRE Transactions on Information Theory, as well as in the other articles referenced therein. The application of spatial filtering to recording color information on black and white film is generally described in reissue Patent No. 20,748 issed to Carlo Bocca, on June 7, 1938.

The entire assemblage of FIGURE 3 is contained in a light tight cassette 25 having openings, not shown, for inserting and removing the components shown therein. The transparency 20 is mounted in brackets 22 to be illuminated by light emanating from a point source of light 24. The source of light 24 may comprise a high intensity lamp. A collimating lens 26 collimates the light from the source 24 and illuminates the transparency 20. The light penetrating through the transparency 20 is focused by a focusing lens 28 onto a focal plane. At the focal plane, a mask 30 is mounted. The mask 30, identified later in detail, comprises an opaque solid having a plurality of apertures. Only the light penetrating through the apertures of the mask 30 is separated spatially from each other and contains the color information of the scene 10.

Figure 4:
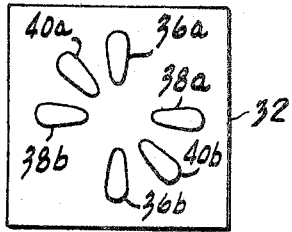
FIGURE 4 is a polychromatic mask for reproducing the color in the scene photographed by the camera of FIGURE 1, FIGURE 5, comprising

In FIGURE 4, there is illustrated a mask 32 having a plurality of apertures which pass all of the color information of the scene 10 in a spatially separated form and which may be substituted for the mask 30 in FIGURE 3. The pair of lobal apertures 36a and 36b which have an axis perpendicular to the horizontal magenta strips M in the spatial filter 18 pass only light proportional to the amount of green in the scene 10. The pair of lobal apertures 38a and 38b, which have an axis normal to the cyan strips C in the filter 18, pass light proportional to the amount of red in the scene 10, whereas the pair of lobal apertures 40a and 40b, having an axis normal to the yellow strips Y in the filter 18 pass light proportional to the blue in the scene 10. The additive primary colors in the scene 10 are therefore effectively extracted from the scene 10 by the subtractive primary color trichromatic filter 18 and then spatially separated by the technique shown in FIGURE 3.

Figure 5A:
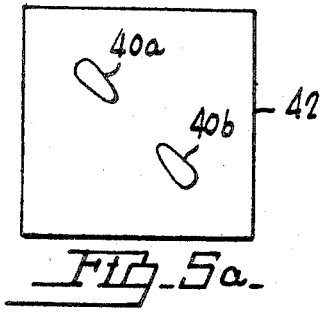
FIGURES 5a, 5b, and 5c, illustrates monochromatic masks utilized to obtain the color separation negatives in accordance with the invention.
Figure 5B:
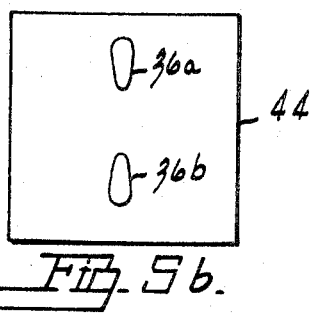
Figure 5C:
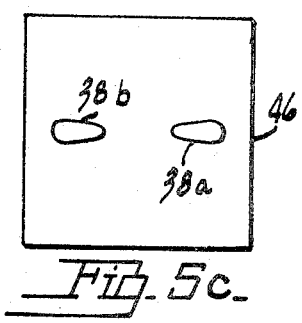

Since the additive primary colors are effectively separated spatially from each other, the color information of each color may be removed from the other colors by replacing the mask 30 with the monochromatic masks 42, 44 and 46 shown in FIGURES 5a, 5b, and 5c. Thus the mask 30 is effectively a generic mask representing, as desired, any of the other masks illustrated in the drawing. The individual monochromatic masks 42, 44, and 46, extract only the information about one color from the transparency 20. The monochromatic masks 42, 44, and 46 extract light proportional to the blue, green and red, respectively, in the scene 10 with each having a pair of lobal apertures for accomplishing such extraction. These pairs of apertures correspond to the apertures in the trichromatic mask 32 for these particular colors and hence are given the same reference numerals given to corresponding apertures in the trichromatic mask 32 of FIGURE 4. Each monochromatic mask 42, 44 and 46 is substituted one at a time for the mask 30 in the focal plane of the lens 28 and the light passing through the apertures is focused by a lens 48 onto photographic film 50. The light from each mask is photographed separately to provide when developed the color separation negatives for the blue, green and red colors in the original scene 10.

Figure 6:
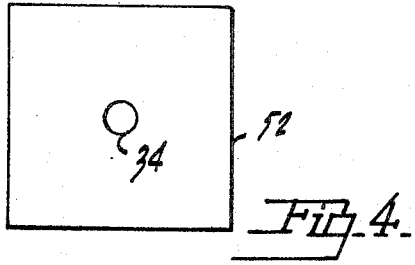
FIGURE 6 is a monochromatic mask utilized to obtain a black separation negative.

One type of black separation mask 52 is shown in FIGURE 6. The black separation mask 52 contains a circular central aperture 34 that passes a luminance spot of the original scene 10. Such a mask 52 when substituted for the mask 30 in FIGURE 3 produces a black separation negative when the film 50 is developed. Furthermore the mask 32 in FIGURE 4 may also be used to prepare a black separation negative by substituting it for the mask 30 in FIGURE 3. The combination of the blue, green, red and black separation negatives are utilized to prepare printing plates to print copies of the original scene 10 in color.

The printing plate may effectively be color corrected before being made by reproducing the original scene 10 in color. This is accomplished by inserting color filters in the apertures of the trichromatic mask 32, replacing the mask 30 by the trichromatic mask 32 and substituting a translucent surface for the photographic film 50. The apertures 36a and 36b have green filters inserted therein whereas the aperture pairs 38a-38b and 40a-40b have red and blue filters inserted therein, respectively. The filters may of course be positioned immediately adjacent the apertures if desired. When such a filtered mask 32 is substituted in the schematic of FIGURE 3 and illuminated as shown, the colors simulating the original scene 10 appear on the surface 50.

If the colors are not in the right proportion, one or more neutral density filters, indicated by a dotted line 54 in FIGURE 3, may be positioned adjacent one or more pairs of the apertures in the mask 32 to reduce the light passing through the mask 32 and hence change the color balance to a more desirable proportion. A neutral density filter 54 may for example comprise a developed photographic film transparency having a desired light transmission characteristic. The same neutral density filters are then positioned adjacent the monochromatic masks 42, 44, 46 when the color separation negatives are prepared to duplicate the desirable color balance previously attained. The black separation mask 52 may also be similarly utilized.

Thus color separation negatives of an original color scene may be obtained from black and white film by practicing the method of this disclosure. Furthermore, the invention has the added advantage that the separation negatives may be color corrected prior to making the printing plates merely by utilizing corrective filters.

What is claimed is:

1. A method for preparing color separation negatives for color printing comprising the steps of,
   photographing an original color scene through a trichromatic spatial filter onto black and white photographic film,
   developing a positive transparency of said film,
   projecting light onto said transparency,
   focusing the light transmitted through said transparency onto a focal plane so that the different colors effectively contained in said black and white transparency are spatially separated from each other at said focal plane,
   positioning one at a time at said focal plane a plurality of monochromatic masks, with each of said masks having at least one aperture positioned to pass one of the different colors effectively contained in said transparency, and
   focusing the light transmitted through each of said masks onto separate photosensitive films to provide when developed the color separation negatives of said original scene.

2. The method in accordance with claim 1 wherein the three colors of the trichromatic spatial filter comprise the subtractive primary colors.

3. The method in accordance with claim 1 wherein the light projected onto said transparency emanates from a point source of light.

4. The method in accordance with claim 3 wherein the light emanating from said point source is collimated before projection onto said transparency.

5. The method in accordance with claim 4 wherein said plurality of masks are opaque to prevent the transmission of light except at said apertures.

6. The method in accordance with claim 5 that further includes the step of
positioning a neutral density filter intermediate said photosensitive film and said plurality of masks to attenuate the proportion of light of particular ones of said colors when desired.

7. The method in accordance with claim 5 that further includes the steps of
substituting for said plurality of monochromatic masks a polychromatic mask having a plurality of apertures with each of said apertures positioned to correspond to one color contained in said transparency,
positioning additive primary color filters in the apertures of said polychromatic mask that correspond to said primary colors,
focusing the light transmitted through said apertures and said color filters onto a surface to superimpose said primary colors over each to simulate the colors in the original scene so as to ascertain color corrections to be made,
replacing said polychromatic mask with said monochromatic masks sequentially, and
adding a neutral density filter positioned intermediate said photosensitive film and a monochromatic filter to alter the color proportions in said separation negatives.

8. The method in accordance with claim 7 wherein said surface comprises a translucent surface.

9. The method in accordance with claim 1 that further includes the step of positioning a mask at said focal plane to prepare a black separation negative.

10. The method in accordance with claim 9 wherein said mask comprises
an opaque mask having a central aperture to pass the luminance in said original scene.

11. The method in accordance with claim 9 wherein said mask comprises
a polychromatic mask having a pluarlity of apertures with each of said apertures positioned to correspond to one color contained in said transparency.

References Cited

UNITED STATES PATENTS 20,748    6/1938    Carlo Bocca _____ 355—32

NORMAN G. TORCHIN, Primary Examiner

A. T. SURO PICO, Assistant Examiner

U.S. Cl. X.R.

96—23; 355—32